(12) United States Patent
Lee (10) Patent No.: US 9,734,611 B2
(45) Date of Patent: Aug. 15, 2017

(54) AROUND VIEW SYSTEM AND OPERATING METHOD THEREOF

(71) Applicant: Hyundai Mobis Co., Ltd., Seoul (KR)

(72) Inventor: Seong soo Lee, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 161 days.

(21) Appl. No.: 14/793,305

(22) Filed: Jul. 7, 2015

(65) Prior Publication Data

US 2016/0012725 A1    Jan. 14, 2016

(30) Foreign Application Priority Data

Jul. 10, 2014   (KR) .................. 10-2014-0086911

(51) Int. Cl.
  *H04N 7/18*    (2006.01)
  *G06T 11/60*   (2006.01)
  *G06K 9/00*    (2006.01)
  *G08G 1/14*    (2006.01)

(52) U.S. Cl.
  CPC .......... *G06T 11/60* (2013.01); *G06K 9/00812* (2013.01); *G08G 1/143* (2013.01); *H04N 7/181* (2013.01)

(58) Field of Classification Search
  None
  See application file for complete search history.

(56) References Cited

U.S. PATENT DOCUMENTS

2004/0257244 A1* 12/2004 Kubota ............. B62D 15/0285
                                                340/932.2
2011/0292079 A1* 12/2011 Hosoi ............... B62D 15/0275
                                                345/632

* cited by examiner

*Primary Examiner* — Eileen Adams
(74) *Attorney, Agent, or Firm* — H.C. Park & Associates, PLC (57) ABSTRACT

An around view system includes: a display module; a camera module configured to photograph surrounding images of a vehicle; and a control module configured to output an around view monitoring (AVM) combined image to the display module, in which the control module includes: a generating unit configured to generate the AVM image; a recognizing unit configured to recognize a first parking line and a second parking line positioned at both sides; and a control unit configured to virtually generate a third parking line parallel to the first parking line, and generate the AVM combined image by combining the third parking line and the AVM image.

7 Claims, 8 Drawing Sheets

AROUND VIEW SYSTEM AND OPERATING METHOD THEREOF

CROSS-REFERENCE TO RELATED APPLICATIONS

This application claims priority from and the benefit of Korean Patent Application No. 10-2014-0086911 filed Jul. 10, 2014, which is hereby incorporated by reference for all purposes as if fully set forth herein.

BACKGROUND

Field

Exemplary embodiments relate to an around view system and an operating method thereof. More particularly, exemplary embodiments relate to an around view system that enables a user to easily recognize a parking line when the user parks a vehicle in a targeted parking section, and an operating method thereof Discussion of the Background A vehicle has been a necessity of modern society for a long time. As vehicles are the main and representative transportation means in modern city life, the number of vehicles is rapidly increasing.

To this end, an automatic parking system has been developed in order to help drivers park their vehicles.

In the operation of an automatic parking system, it is typically first determined whether parking is available by scanning for a parking space by using an ultrasonic sensor mounted in a vehicle and checking for obstacles located in a corresponding region. However, this has a disadvantage in that the direction of a target parking position may be misaligned relative to the position of a previously parked vehicle, and the boundary of the vehicles parked on the left and right sides may not be precisely recognized with an ultrasonic sensor having a predetermined beam width. Accordingly, the success rate of identifying a target parking position may be low.

A parking assistant system using an ultrasonic sensor may execute parking control based on the position and direction of an object, which already exists in the space searched, so that when there are no parked vehicles, it may be impossible to set a parking reference. Thus, it is impossible to provide the automatic parking assistant function to the user.

Recently, research for applying an around view system in order to photograph surrounding images of a vehicle through a camera module mounted in the vehicle to recognize a parking section, in which a curb or a parking section line does not exist, in the surrounding images has been conducted.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide an around view system, which enables a user to easily recognize a parking line when the user parks a vehicle in a targeted parking section, and an operating method thereof.

Additional aspects will be set forth in the detailed description which follows, and, in part, will be apparent from the disclosure, or may be learned by practice of the inventive concept.

Exemplary embodiments provide an around view system, including: a display module; a camera module configured to photograph images surrounding the vehicle; and a control module configured to output an around view monitoring (AVM) combined image obtained by combining the surrounding images and sending it to the display module. The control module includes: a generating unit configured to generate the AVM image by converting a view of the surrounding image; a recognizing unit configured to recognize a first parking line and a second parking line positioned at the sides of the vehicle based on the center line of the vehicle in the AVM image; and a control unit configured to virtually generate a third parking line parallel to the first parking line, and generate the AVM combined image obtained by combining the third parking line and the AVM image when recognizing only the first parking line that is a parking line positioned at any one side based on the center line of the vehicle between the first parking line and the second parking line.

Another exemplary embodiment provides a method of operating an around view system, including: generating an around view monitoring (AVM) image by converting a view of a surrounding image of a vehicle; recognizing parking lines in the AVM image; determining whether all of a first parking line and a second parking line positioned at both sides based on a center line of the vehicle among the parking lines are recognized; and virtually generating a third parking line parallel to the first parking line, and generating the AVM combined image obtained by combining the third parking line and the AVM image when recognizing only the first parking line that is a parking line positioned at any one side based on the center line of the vehicle between the first parking line and the second parking line.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
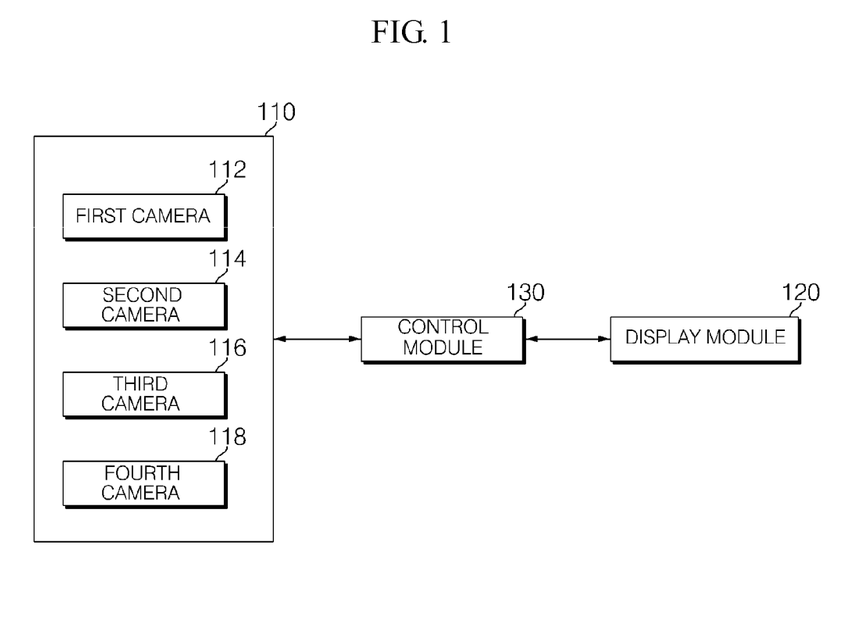
FIG. 1 is a control block diagram illustrating a control configuration of an around view system according to exemplary embodiments.
Figure 2:
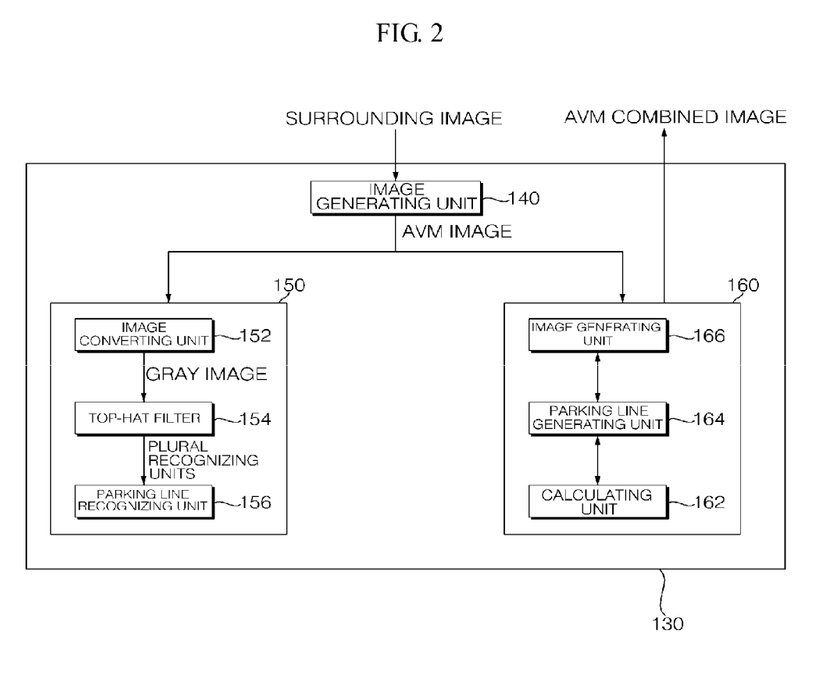
FIG. 2 is a control block diagram illustrating a control configuration of a control module illustrated in FIG. 1.

Referring to FIGS. 1 and 2, the around view system may include a camera module 110, a display module 120, and a control module 130.

The camera module 110 may include a first camera 112, a second camera 114, a third camera 116, and a fourth camera 118.

In the exemplary embodiment, it is described that the camera module 110 includes four cameras, 112, 114, 116, and 118, but the camera module 110 may include only the second camera 114 photographing a rear image of the vehicle, and the number of cameras is not limited.

In the exemplary embodiment, it is described and illustrated in the drawing that each of the first to fourth cameras 112, 114, 116, and 118 transmits a photographed image to the control module 130, and exemplary embodiments may include a camera control unit (not illustrated) for combining images photographed by the first to fourth cameras 112, 114, 116, and 118, generating a surrounding image, and transmitting the generated surrounding image to the control module 130, but exemplary embodiments are not limited thereto.

The display module 120 may display an around view monitoring (AVM) combined image received from the control module 130.

The display module 120 may include a touch display panel through which a user may input a touch, but is not limited thereto.

The control module 130 may collect travel information about the vehicle, such as speed and gear position of the vehicle from a plurality of sensors (not illustrated) installed in the vehicle.

In this case, the control module 130 may issue a command to generate an AVM combined image obtained by combining the surrounding images photographed by the first to fourth cameras 112, 114, 116, and 118 according to the travel information collected by the plurality of sensors in accordance with a predetermined reference. The AVM combined image is thus generated and displayed on the display module 120.

As illustrated in FIG. 2, the control module 130 may include a generating unit 140, a recognizing unit 150, and a control unit 160.

The generating unit 140 may generate an AVM image, in which a view of the surrounding image is converted.

Particularly, the generating unit 140 may convert views of the images photographed by the first to fourth cameras 112, 114, 116, and 118 according to a predetermined conversion ratio and generates the AVM image. For example, the generating unit 140 may convert a view of the front image so as to obtain an image as if a front region of the vehicle is viewed from an elevated point of view by applying a predetermined first conversion ratio to the front image received from one or more cameras. Further, the generating unit 140 may convert views of the rear image, the left-side image, and the right-side image by applying second to fourth conversion ratios to one or more cameras photographing those sides. Accordingly, the generating unit 140 may generate the AVM image obtained by combining the converted views to the front image, the rear image, the left-side image, and the right-side image.

The recognizing unit 150 may include an image converting unit 152 for converting the AVM image into a gray image, a top-hat filter 154 for extracting a plurality of characteristic points by using a luminance deviation or a brightness deviation of the gray image, and a parking line recognizing unit 156 for extracting a line component for the plurality of characteristic points and recognizing the parking line displayed in the AVM image. The parking line recognizing unit 156 may recognize a parking line indicated in a targeted parking section displayed in the AVM image.

The image converting unit 152 image-converts the AVM image into the gray image according to a predetermined image conversion method.

The top-hat filter 154 may extract the plurality of characteristic points corresponding to points. The points may be points at which the luminance deviation or the brightness deviation is generated in the gray image.

For example, the top-hat filter 154 may generally measure the luminance deviation or brightness deviation between a white parking line and a general road, and extract a center point. The center point in which the luminance deviation or the brightness deviation is generated as selected as the characteristic point.

Figure 3:
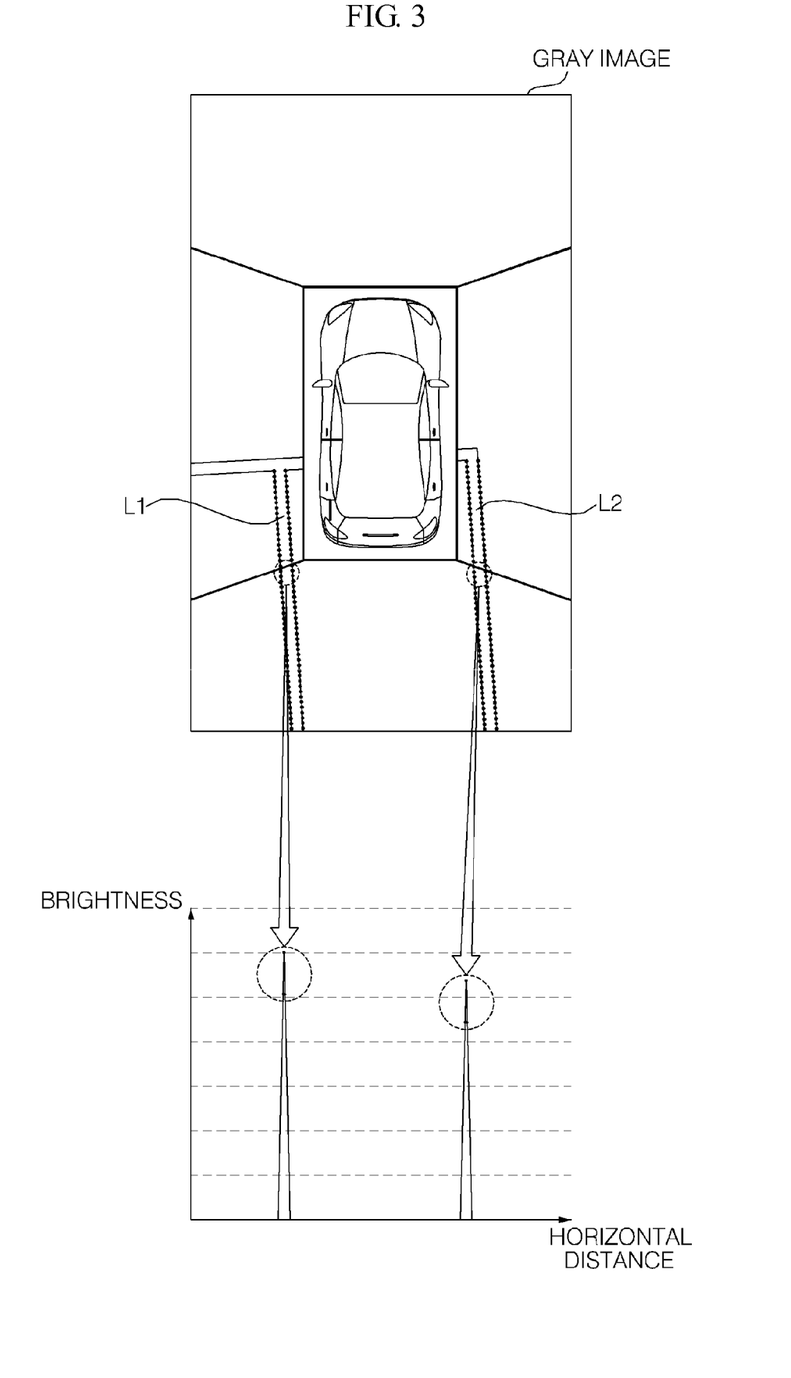
FIG. 3 is a diagram showing extraction a characteristic point of a parking line by the around view system according to exemplary embodiments.

That is, as illustrated in FIG. 3, the top-hat filter 154 may measure the luminance deviation or the brightness deviation in a horizontal direction or a predetermined horizontal line in the targeted parking section displayed in the gray image.

For example, when it is assumed that the parking line is a white color, and a brightness deviation is measured according to a horizontal direction in the gray image illustrated in FIG. 3, regions displayed with a first parking line L1 and a second parking line L2 have higher brightness than that of the remaining regions.

In this case, the top-hat filter 154 may extract a characteristic point for each of the first parking line L1 and the second parking line L2 among the parking lines. The first parking line L1 may refer to a parking line positioned at any one side (for example, a left side of a center line of the vehicle) based on a center line of the vehicle, and the second parking line L2 may refer to a parking line positioned at an opposite side (for example, a right side of the center line of the vehicle) of the first parking line based on the center line of the vehicle.

Here, the characteristic point may refer to a measured center point at which a brightness deviation equal to or larger than a reference value. Additionally or alternatively, a characteristic a center point between two points, at which a brightness deviation equal to or larger than a reference value is measured, in the gray image. For example, a center of the first parking line L1 and a center of the second parking line L2 illustrated in FIG. 3 may be extracted as the characteristic points.

In the meantime, the top-hat filter 154 may measure a value in a triangular shape along widths of a left parking line and a right parking line of the targeted parking section displayed in the gray image, and extract a value of a center of the triangular shape as a characteristic point.

The parking line recognizing unit 156 may extract a line component from the plurality of characteristic points extracted by the top-hat filter 154 and may recognize the parking line. For example, the parking line recognizing unit 156 may extract the line component by sequentially connecting the plurality of characteristic points.

Figure 4A:
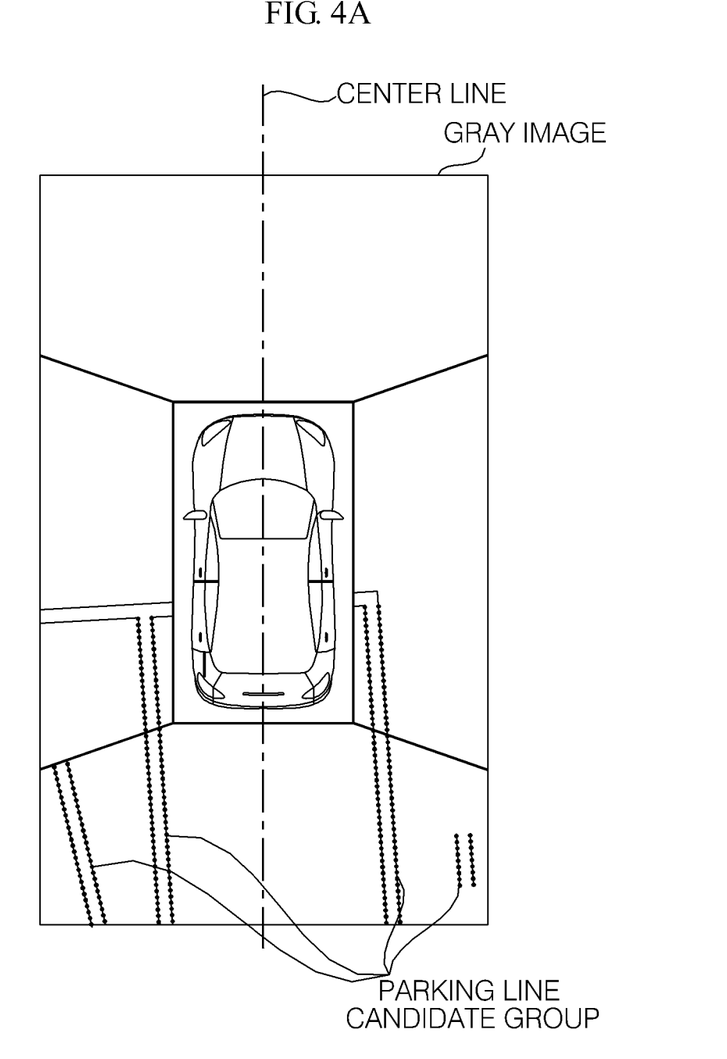
FIGS. 4A and 4B are diagrams showing recognition of a parking line by the around view system according to exemplary embodiments.
Figure 4B:
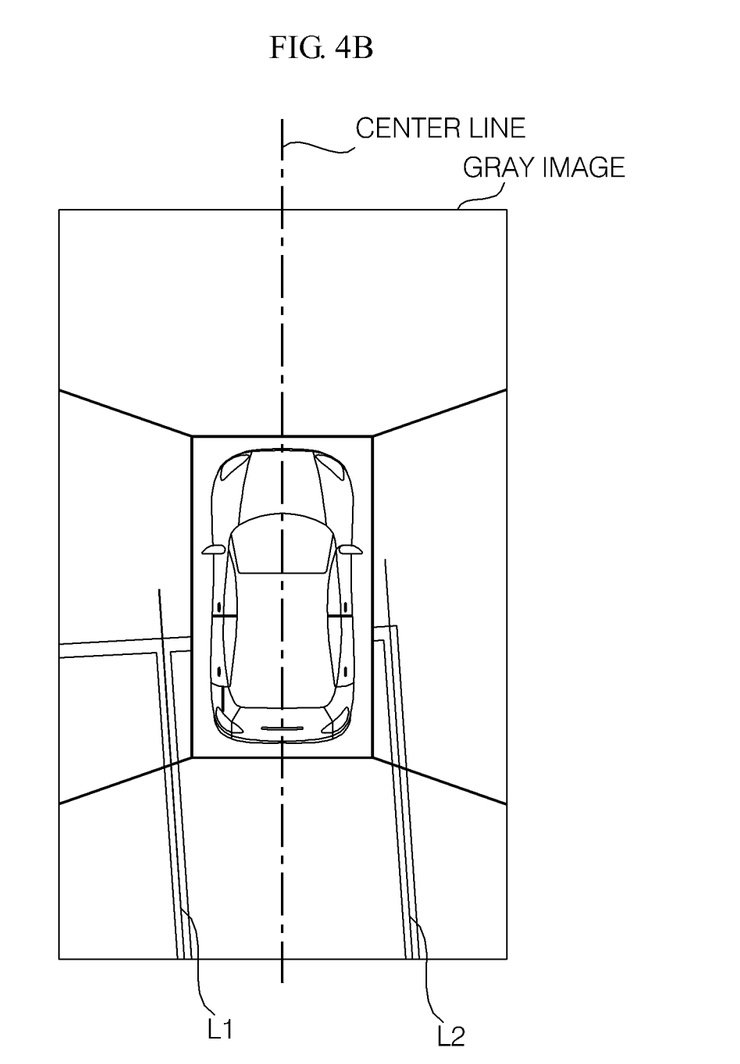

That is, as illustrated in FIG. 4, the parking line recognizing unit 156 may extract the line component for the characteristic points of each of the first parking line L1 and the second parking line L2 illustrated in FIG. 3, correct an angle error for the first parking line L1 and the second parking line L2, and recognize the first parking line and the second parking line, which are positioned at opposite sides based on a center line of a current vehicle.

FIG. 4A illustrates a plurality of parking line candidate groups corresponding to each of the plurality of line components for the plurality of characteristic points and a center line of the vehicle extracted from the gray image illustrated in FIG. 3, and FIG. 4B illustrates a case where all of the first parking line L1 and the second parking line L2 corresponding to the targeted parking section are recognized in the plurality of parking line candidate groups illustrated in FIG. 4A.

Figure 5A:
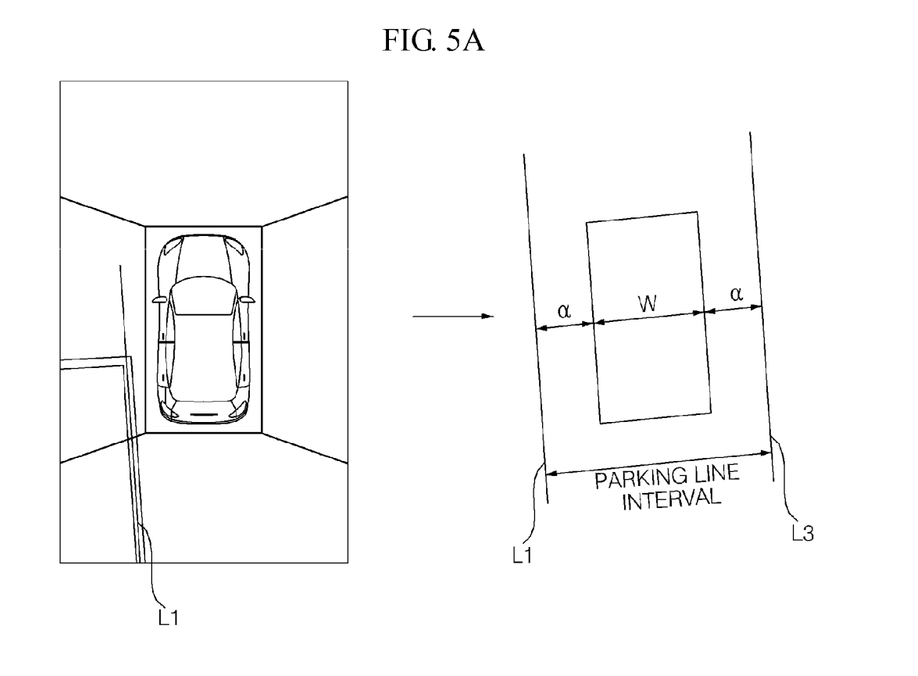
FIGS. 5A and 5B are diagrams showing a third parking line virtually generated by recognizing a first parking line among the parking lines by the around view system according to exemplary embodiments.

In the exemplary embodiment illustrated in FIG. 5A, a case is illustrated where the control unit 160 recognizes only the first parking line L1 among the parking lines of the targeted parking section, and the control unit 160 may be used to generate only the second parking line L2, but exemplary embodiments are not limited thereto.

The control unit 160 may include a calculating unit 162, a parking line generating unit 164, and an image generating unit 166. When only the first parking line L1 of the first parking line L1 and the second parking line L2 is recognized by the recognizing unit 150, the calculating unit 162 may calculate a parking line interval of the targeted parking section. The parking line generating unit 164 may virtually generate a third parking line L3 spaced from the first parking line L1 in parallel by the parking line interval. The image generating unit 166 includes an image generating unit 166 generating the AVM combined image obtained by combining the AVM image to the virtually generated third parking line L3. In this case, the image generating unit 166 may combine the third parking line L3, which has a different color from that of the first parking line L1, and the AVM image.

The calculating unit 162 may calculate the parking line interval based on the steering angle of the vehicle, vehicle width, and the distance between the vehicle and the first parking line L1.

For example, referring to FIG. 5A, the calculating unit 162 may calculate the parking line interval based on at least one of the vehicle width W, a distance a between the vehicle and the first parking line L1, and the steering angle. Here, the parking line interval may means a distance between the previously recognized first parking line L1 and the third parking line L3, which is to be virtually generated.

For example, when it is assumed that a current position of the vehicle is the center of the targeted parking section, the calculating unit 162 may calculate the parking line interval, by which the third parking line L3 to be virtually generated needs to be spaced apart from the first parking line, by using the vehicle width W and a distance $\alpha$ between the vehicle and the first parking line L1, but exemplary embodiments are not limited thereto. For example, referring to FIG. 5A, the interval between the first parking line L1 and the third parking line L3 may be a value $2\alpha+W$ obtained by adding a value of two times of the distance a between the vehicle and the first parking line L1 to the vehicle width W.

The control unit 160 may virtually generate the third parking line L3 at a position spaced apart from the first parking line L1 in parallel by $2\alpha+W$, which is the parking line interval, and generate the AVM combined image by combining the third parking line and the AVM image.

Figure 5B:
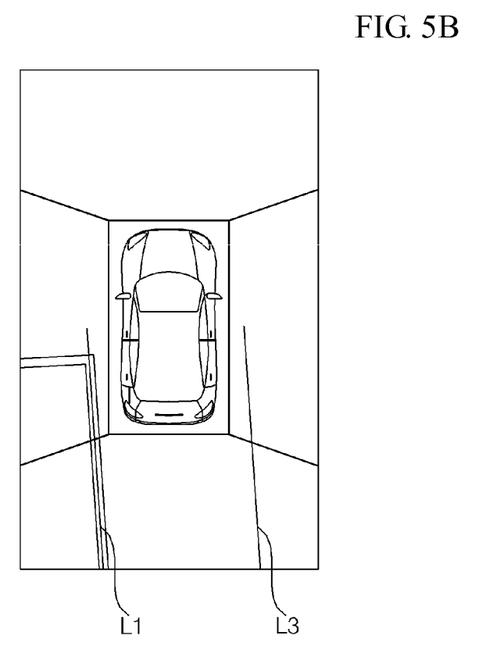

Referring to FIG. 5B, the control unit 160 may issue a command so that the virtually generated third parking line L3 is displayed on the display module 120 with a different color from that of the first parking line L1, thereby enabling a driver to recognize the third parking line L3 as a virtual parking line.

Figure 6:
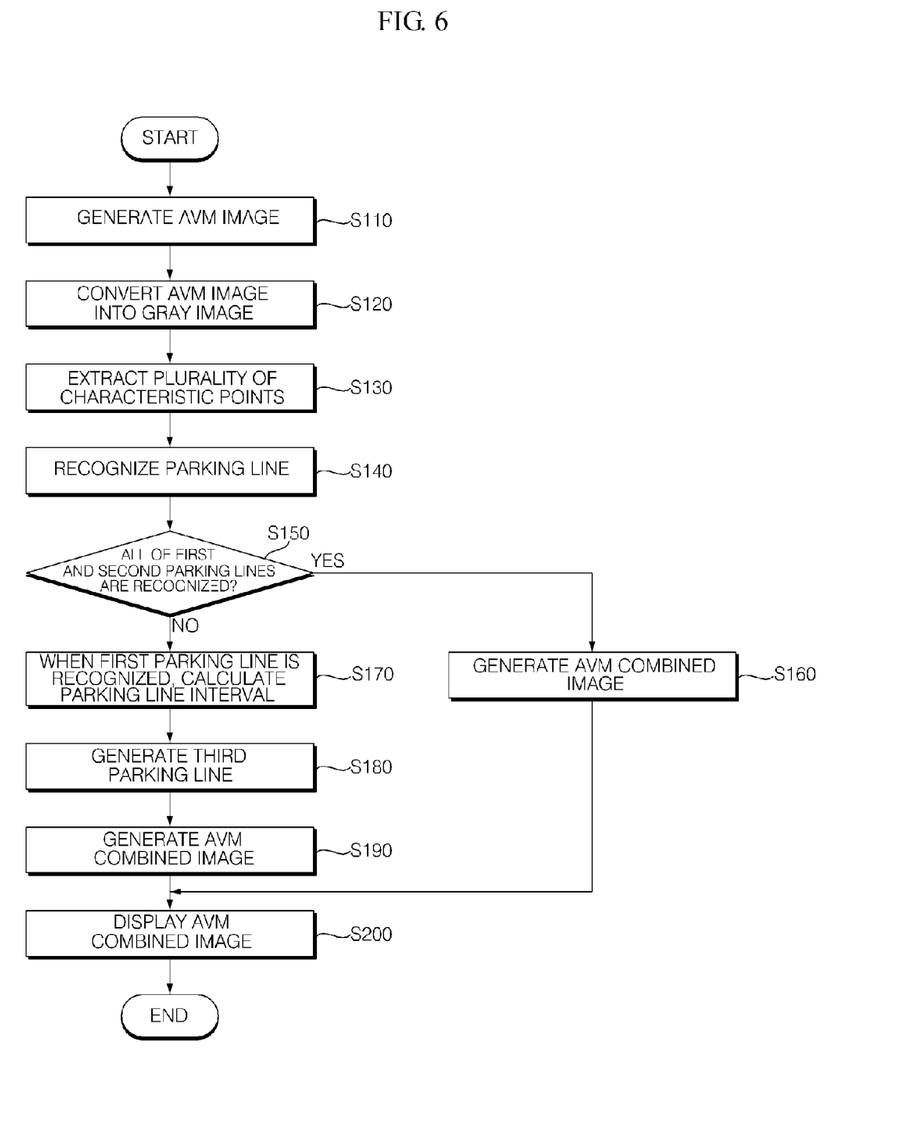
FIG. 6 is a flowchart illustrating an operating method of the around view system according to exemplary embodiments.

FIG. 6 is a flowchart illustrating an operating method of the around view system according to exemplary embodiments.

Referring to FIG. 6, the around view system generates an AVM image, in which a view of a surrounding image of the vehicle is converted (S110). For example, the around view system may generate the AVM image when the vehicle approaches a targeted parking section. In this case, the around view system may determine whether the vehicle approaches the targeted parking section by using global positioning system (GPS) information and/or the like.

Next, the around view system converts the AVM image into a gray image (120), and extracts a plurality of characteristic points by using a luminance deviation and/or a brightness deviation of the gray image (S130).

Next, the around view system extracts a line component from the plurality of characteristic points, and recognizes a parking line displayed in the gray image (S140).

Next, the around view system may determine whether all of a first parking line and a second parking line are recognized in operation S140 (S150). Here, the first parking line may be a left parking line, and the second parking line may be a right parking line.

When it is determined that all of the first parking line and the second parking line are recognized in operation S150, the around view system may generate an AVM combined image by combining the first parking line and the second parking line to the AVM image (S160). In this case, the first parking line and the second parking line may be combined to the AVM image so as to be displayed with the same color.

When it is determined that only one parking line (the first parking line) is recognized in operation S150, the around view system calculates a parking line interval, by which the remaining parking line (that is, a third parking line) to be virtually generated needs to be spaced apart from the previously recognized parking line (that is, the first parking line) (S170), and virtually generates the third parking line spaced apart from the first parking line in parallel by the parking line interval (S180).

Then, the around view system generates the AVM combined image obtained by combining the AVM image and the virtually generated third parking line (S190). In this case, the around view system may combine the third parking line, which has a different color from that of the first parking line, and the AVM image.

The around view system may display the AVM combined image generated in any one operation of operation S160 and operation S190 (S200).

According to the around view system and the operating method thereof according exemplary embodiments, an AVM combined image, in which a virtual parking line is set, is displayed based on surrounding images of a vehicle in a targeted parking section, in which a parking line does not exist, so that a user is capable of recognizing the targeted parking section of a vehicle and easily park the vehicle, thereby improving convenience for the user.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An around view system, comprising:
   a display module;
   a camera module configured to generate photograph images of areas surrounding a vehicle; and
   a control module configured to output an around view monitoring (AVM) combined image obtained by combining the surrounding images to the display module,
   wherein the control module comprises:
      a generating unit configured to generate the AVM image by converting a view of the surrounding image;
      a recognizing unit configured to recognize a one or both of a first parking line and a second parking line positioned at either or both sides of a center line of the vehicle according to the AVM image; and
      a control unit configured to virtually generate a third parking line parallel to the first parking line and generate the AVM combined image obtained by combining the third parking line and the AVM image when recognizing only the first parking line that is a parking line positioned at any one side based on the center line of the vehicle, and
   wherein the recognizing unit comprises:
      an image converting unit configured to convert the AVM image into a gray image;
      a top-hat filter configured to extract characteristic points by using at least one of a luminance deviation and a brightness deviation of the gray image; and
      a parking line recognizing unit configured to extract line components from the characteristic points, and recognize the parking lines displayed in a targeted parking section displayed in the gray image.

2. The around view system of claim 1, wherein the camera module comprises cameras configured to generate photograph images of areas surrounding a vehicle, the areas comprising at least one of a front, a rear, a left, and a right area of the vehicle.

3. The around view system of claim 1, wherein the control unit comprises:
   a calculating unit configured to calculate a parking line interval of the targeted parking section when recognizing only one of the first or the second parking line;
   a parking line generating unit configured to virtually generate the third parking line at a position spaced apart from the first parking line in parallel by the parking line interval; and
   an image generating unit configured to generate the AVM combined image by combining the third parking line and the AVM image,
   wherein the control unit controls the display module such that the third parking line is displayed with a different color from that of the first parking line.

4. The around view system of claim 3, wherein the calculating unit calculates the parking line interval based on at least one of a steering angle of the vehicle, a vehicle width, and a distance between the vehicle and the first parking line.

5. A method of operating an around view system, comprising:
   generating an around view monitoring (AVM) image by converting a view of a surrounding image of a vehicle;
   recognizing parking lines in the AVM image;

determining whether one or both of a first parking line and a second parking line positioned at both sides based on a center line of the vehicle among the parking lines are recognized; and virtually generating a third parking line parallel to the first parking line, and generating the AVM combined image obtained by combining the third parking line and the AVM image when recognizing only the first parking line that is a parking line positioned at any one side based on the center line of the vehicle, wherein recognizing the parking line in the AVM image comprises:

converting the AVM image into a gray image;

extracting characteristic points by using at least one of a luminance deviation and a brightness deviation of the gray image; and extracting line components from the characteristic points, and recognizing the first parking line and the second parking line displayed in a targeted parking section displayed in the gray image.

6. The method of claim 5, wherein the generating comprises:

calculating a parking line interval of the targeted parking section when recognizing only the first parking line;

virtually generating the third parking line at a position spaced apart from the first parking line in parallel by the parking line interval; and generating the AVM combined image obtained by combining the third parking line and the AVM image.

7. The method of claim 5, further comprising:

displaying the AVM combined image, wherein the third parking line is displayed with a different color from that of the first parking line in the AVM combined image.

* * * * *